(12) United States Patent
Beavers et al.

(10) Patent No.: US 11,625,790 B2
(45) Date of Patent: *Apr. 11, 2023

(54) VIRTUAL COLLABORATION

(71) Applicant: Allstate Insurance Company, Northbrook, IL (US)

(72) Inventors: Sean Beavers, Morton Grove, IL (US); Christopher Paul Gutsell, Gurnee, IL (US); Cheryl Lewis, Libertyville, IL (US); Margaret K. Striebich, Chicago, IL (US); John P. Kelsh, Antioch, IL (US)

(73) Assignee: Allstate Insurance Company, Northbrook, IL (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/848,275

(22) Filed: Apr. 14, 2020

(65) Prior Publication Data

US 2020/0242701 A1 Jul. 30, 2020

Related U.S. Application Data

(63) Continuation of application No. 15/294,147, filed on Oct. 14, 2016, now Pat. No. 10,657,599.

(51) Int. Cl.
*G06Q 40/00* (2012.01)
*G06Q 40/08* (2012.01)
*G06Q 10/10* (2023.01)

(52) U.S. Cl.
CPC ............. *G06Q 40/08* (2013.01); *G06Q 10/10* (2013.01)

(58) Field of Classification Search
CPC ............................... G06Q 40/08; G06Q 10/10
See application file for complete search history.

(56) References Cited

U.S. PATENT DOCUMENTS

| D297,243 S | 8/1988 | Wells-Papanek et al. |
| D298,144 S | 10/1988 | Wells-Papanek et al. |

(Continued)

FOREIGN PATENT DOCUMENTS

| CA | 2477506 A1 | 2/2006 |
| EP | 0 793 184 A | 9/1997 |

(Continued)

OTHER PUBLICATIONS

Olsen et al: "What We Know about Demand Surge: Brief Summary", Natural Hazards Review. (Year: 2011).*

(Continued)

*Primary Examiner* — Edward J Baird
(74) *Attorney, Agent, or Firm* — Foley & Lardner LLP

(57) ABSTRACT

A method, medium, and apparatus for allowing evaluation of property, such as damaged property, remotely and efficiently. A mobile computing device at the location of the property may be used to transmit video of the property to an adjuster, and to receive video and audio communications from the adjuster. The adjuster may be selected from a queue based on time waiting in the queue and/or a number of other statistics and attributes of the adjuster. The adjuster may converse with an owner of the property and capture video of the property in order to make an appraisal or determine the infeasibility of remote appraisal and the need to instruct another adjuster to perform a physical inspection.

18 Claims, 11 Drawing Sheets

(56) References Cited

U.S. PATENT DOCUMENTS

| | | |
|---|---|---|
| D299,142 S | 12/1988 | Berg |
| 5,870,711 A | 2/1999 | Huffman |
| D416,240 S | 11/1999 | Jensen et al. |
| D468,748 S | 1/2003 | Inagaki |
| 6,744,878 B1 | 6/2004 | Komissarchik et al. |
| 6,771,765 B1 | 8/2004 | Crowther et al. |
| D523,442 S | 6/2006 | Hiramatsu |
| 7,088,814 B1 | 8/2006 | Shaffer et al. |
| 7,103,171 B1 | 9/2006 | Annadata et al. |
| D534,539 S | 1/2007 | Frey et al. |
| D539,808 S | 4/2007 | Cummins et al. |
| D540,341 S | 4/2007 | Cummins et al. |
| D544,494 S | 6/2007 | Cummins |
| D547,365 S | 7/2007 | Reyes et al. |
| 7,289,964 B1 | 10/2007 | Bowman-Amuah |
| D562,339 S | 2/2008 | Keohane |
| D569,871 S | 5/2008 | Anastasopoulos et al. |
| D570,864 S | 6/2008 | Sadler et al. |
| D574,008 S | 7/2008 | Armendariz et al. |
| D576,634 S | 9/2008 | Clark et al. |
| D579,943 S | 11/2008 | Clark et al. |
| D580,941 S | 11/2008 | Scott et al. |
| D580,942 S | 11/2008 | Oshiro et al. |
| D582,936 S | 12/2008 | Scalisi et al. |
| D583,386 S | 12/2008 | Tomizawa et al. |
| D583,823 S | 12/2008 | Chen et al. |
| D587,276 S | 2/2009 | Noviello et al. |
| D590,407 S | 4/2009 | Watanabe et al. |
| D592,219 S | 5/2009 | Agarwal et al. |
| D594,026 S | 6/2009 | Ball et al. |
| D594,872 S | 6/2009 | Akimoto |
| D596,192 S | 7/2009 | Shotel |
| D608,366 S | 1/2010 | Matas |
| D614,194 S | 4/2010 | Guntaur et al. |
| D616,450 S | 5/2010 | Simons et al. |
| D617,804 S | 6/2010 | Hirsch |
| 7,936,867 B1 * | 5/2011 | Hill .................... H04M 3/5233 379/265.12 |
| 8,046,281 B1 * | 10/2011 | Urrutia .................. G06Q 10/06 705/7.17 |
| D648,735 S | 11/2011 | Arnold et al. |
| 8,347,295 B1 * | 1/2013 | Robertson ............. G06Q 10/06 718/103 |
| D676,456 S | 2/2013 | Walsh et al. |
| D677,275 S | 3/2013 | Wujcik et al. |
| D677,326 S | 3/2013 | Gleasman et al. |
| D677,686 S | 3/2013 | Reyna et al. |
| D678,904 S | 3/2013 | Phelan |
| D681,654 S | 5/2013 | Hirsch et al. |
| D682,849 S | 5/2013 | Aoshima |
| D682,873 S | 5/2013 | Frijlink et al. |
| D683,751 S | 6/2013 | Carpenter et al. |
| D684,587 S | 6/2013 | Plesnicher et al. |
| D685,386 S | 7/2013 | Makhlouf |
| D687,061 S | 7/2013 | Cueto et al. |
| D687,454 S | 8/2013 | Edwards et al. |
| D687,455 S | 8/2013 | Edwards et al. |
| 8,510,196 B1 | 8/2013 | Brandmaier et al. |
| D689,068 S | 9/2013 | Edwards et al. |
| D691,157 S | 10/2013 | Ramesh et al. |
| D691,618 S | 10/2013 | Chen et al. |
| D693,835 S | 11/2013 | Daniel |
| 8,712,893 B1 | 4/2014 | Brandmaier et al. |
| D704,205 S | 5/2014 | Greisson et al. |
| D706,796 S | 6/2014 | Talbot |
| D708,210 S | 7/2014 | Capua et al. |
| D709,517 S | 7/2014 | Meegan et al. |
| D711,411 S | 8/2014 | Yu et al. |
| D715,814 S | 10/2014 | Brinda et al. |
| D716,329 S | 10/2014 | Wen et al. |
| D719,583 S | 12/2014 | Edwards et al. |
| D719,968 S | 12/2014 | Ebtekar et al. |
| D720,363 S | 12/2014 | Ranz et al. |
| D725,139 S | 3/2015 | Izotov et al. |
| 8,977,237 B1 * | 3/2015 | Sander .................... H04W 4/12 455/411 |
| D727,931 S | 4/2015 | Kim et al. |
| D729,264 S | 5/2015 | Satalkar et al. |
| D730,371 S | 5/2015 | Lee |
| D730,388 S | 5/2015 | Rehberg et al. |
| D731,510 S | 6/2015 | Kiruluta et al. |
| D731,512 S | 6/2015 | Xu et al. |
| D733,185 S | 6/2015 | Smith et al. |
| D734,358 S | 7/2015 | Rehberg et al. |
| D735,221 S | 7/2015 | Mishra et al. |
| D735,223 S | 7/2015 | Prajapati et al. |
| D735,745 S | 8/2015 | Zuckerberg et al. |
| D738,894 S | 9/2015 | Kim et al. |
| D738,906 S | 9/2015 | Frijlink et al. |
| D746,862 S | 1/2016 | Lee et al. |
| D748,112 S | 1/2016 | Vonshak et al. |
| D751,086 S | 3/2016 | Winther et al. |
| D752,059 S | 3/2016 | Yoo |
| D755,830 S | 5/2016 | Chaudhri et al. |
| D759,080 S | 6/2016 | Luo et al. |
| D759,663 S | 6/2016 | Kim et al. |
| D759,687 S | 6/2016 | Chang et al. |
| 9,367,535 B2 | 6/2016 | Bedard et al. |
| D760,772 S | 7/2016 | Winther et al. |
| D761,303 S | 7/2016 | Nelson et al. |
| D761,841 S | 7/2016 | Jong et al. |
| D763,282 S | 8/2016 | Lee |
| D764,483 S | 8/2016 | Heinrich et al. |
| 9,407,874 B2 | 8/2016 | Laurentino et al. |
| D766,286 S | 9/2016 | Lee et al. |
| D766,289 S | 9/2016 | Bauer et al. |
| D767,598 S | 9/2016 | Choi |
| 9,443,270 B1 | 9/2016 | Friedman et al. |
| D768,162 S | 10/2016 | Chan et al. |
| D768,202 S | 10/2016 | Malkiewicz |
| D769,253 S | 10/2016 | Kim et al. |
| D770,513 S | 11/2016 | Choi et al. |
| 9,501,798 B1 | 11/2016 | Urrutia et al. |
| D773,481 S | 12/2016 | Everette et al. |
| D773,523 S | 12/2016 | Kisselev et al. |
| D774,078 S | 12/2016 | Kisselev et al. |
| D775,144 S | 12/2016 | Vazquez |
| D780,202 S | 2/2017 | Bradbury et al. |
| D785,009 S | 4/2017 | Lim et al. |
| D789,956 S | 6/2017 | Ortega et al. |
| D792,424 S | 7/2017 | Meegan et al. |
| D792,441 S | 7/2017 | Gedrich et al. |
| D795,287 S | 8/2017 | Sun |
| D797,117 S | 9/2017 | Sun |
| D797,769 S | 9/2017 | Li |
| D800,748 S | 10/2017 | Jungmann et al. |
| 9,824,453 B1 | 11/2017 | Collins et al. |
| D806,101 S | 12/2017 | Frick et al. |
| D809,542 S | 2/2018 | Lu |
| D809,561 S | 2/2018 | Forsblom |
| D814,518 S | 4/2018 | Martin et al. |
| D814,520 S | 4/2018 | Martin et al. |
| D815,667 S | 4/2018 | Yeung |
| 9,947,050 B1 | 4/2018 | Pietrus et al. |
| D819,647 S | 6/2018 | Chen et al. |
| D820,296 S | 6/2018 | Aufmann et al. |
| D822,688 S | 7/2018 | Lee et al. |
| D822,711 S | 7/2018 | Bachman et al. |
| D826,984 S | 8/2018 | Gatts et al. |
| D830,408 S | 10/2018 | Clediere |
| D832,875 S | 11/2018 | Yeung et al. |
| D834,613 S | 11/2018 | Lee et al. |
| D837,814 S | 1/2019 | Lamperti et al. |
| D841,669 S | 2/2019 | Hansen et al. |
| D844,020 S | 3/2019 | Spector |
| D845,332 S | 4/2019 | Shriram et al. |
| D847,161 S | 4/2019 | Chaudhri et al. |
| D851,112 S | 6/2019 | Papolu et al. |
| D851,126 S | 6/2019 | Tauban |
| D851,127 S | 6/2019 | Tauban |
| D851,663 S | 6/2019 | Guesnon, Jr. |
| D851,668 S | 6/2019 | Jiang et al. |
| D852,217 S | 6/2019 | Li |

(56) References Cited

U.S. PATENT DOCUMENTS

| | | | |
|---|---|---|---|
| D853,407 S | 7/2019 | Park | |
| D858,571 S | 9/2019 | Jang | |
| D859,445 S | 9/2019 | Clediere | |
| D863,340 S | 10/2019 | Akana | |
| D865,795 S | 11/2019 | Koo | |
| D866,582 S | 11/2019 | Koo | |
| 2002/0029285 A1 | 3/2002 | Collins | |
| 2003/0187672 A1 | 10/2003 | Gibson et al. | |
| 2004/0224772 A1 | 11/2004 | Canessa et al. | |
| 2004/0249650 A1 | 12/2004 | Freedman et al. | |
| 2005/0038682 A1 | 2/2005 | Gandee et al. | |
| 2005/0204148 A1 | 9/2005 | Mayo et al. | |
| 2006/0009213 A1 | 1/2006 | Sturniolo et al. | |
| 2007/0100669 A1* | 5/2007 | Wargin | G06Q 10/06316 705/7.26 |
| 2007/0130197 A1 | 6/2007 | Richardson et al. | |
| 2007/0219816 A1* | 9/2007 | Van Luchene | G06Q 10/06 705/80 |
| 2007/0265949 A1 | 11/2007 | Elder | |
| 2007/0282639 A1 | 12/2007 | Leszuk et al. | |
| 2008/0015887 A1 | 1/2008 | Drabek et al. | |
| 2008/0147448 A1 | 6/2008 | McLaughlin et al. | |
| 2008/0255917 A1 | 10/2008 | Mayfield et al. | |
| 2008/0300924 A1 | 12/2008 | Savage et al. | |
| 2009/0183114 A1 | 7/2009 | Matulic | |
| 2010/0125464 A1 | 5/2010 | Gross et al. | |
| 2010/0130176 A1 | 5/2010 | Wan et al. | |
| 2010/0205567 A1 | 8/2010 | Haire et al. | |
| 2010/0223172 A1 | 9/2010 | Donnelly et al. | |
| 2011/0015947 A1 | 1/2011 | Erry et al. | |
| 2011/0035793 A1 | 2/2011 | Appelman et al. | |
| 2013/0204645 A1 | 8/2013 | Lehman et al. | |
| 2013/0226624 A1 | 8/2013 | Blessman et al. | |
| 2013/0317864 A1 | 11/2013 | Tofte et al. | |
| 2014/0104372 A1 | 4/2014 | Calman et al. | |
| 2014/0240445 A1 | 8/2014 | Jaynes | |
| 2014/0288976 A1 | 9/2014 | Thomas et al. | |
| 2014/0320590 A1* | 10/2014 | Laurentino | H04N 7/155 348/14.08 |
| 2014/0369668 A1 | 12/2014 | Onoda | |
| 2015/0025915 A1 | 1/2015 | Lekas | |
| 2015/0187017 A1 | 7/2015 | Weiss | |
| 2015/0189362 A1 | 7/2015 | Lee et al. | |
| 2015/0244751 A1 | 8/2015 | Lee et al. | |
| 2015/0248730 A1 | 9/2015 | Pilot et al. | |
| 2015/0278728 A1* | 10/2015 | Dinamani | G06Q 40/08 705/4 |
| 2015/0365342 A1 | 12/2015 | McCormack et al. | |
| 2016/0080570 A1* | 3/2016 | O'Connor | H04M 3/5133 379/265.09 |
| 2016/0171486 A1 | 6/2016 | Wagner et al. | |
| 2016/0171622 A1 | 6/2016 | Perkins et al. | |
| 2016/0203443 A1 | 7/2016 | Wheeling | |
| 2016/0217433 A1 | 7/2016 | Walton et al. | |
| 2017/0068526 A1 | 3/2017 | Seigel | |
| 2017/0126812 A1 | 5/2017 | Singhal | |
| 2017/0154383 A1 | 6/2017 | Wood | |
| 2017/0352103 A1 | 12/2017 | Choi et al. | |
| 2018/0007059 A1 | 1/2018 | Innes et al. | |
| 2018/0108091 A1 | 4/2018 | Beavers et al. | |
| 2019/0149772 A1 | 5/2019 | Fernandes et al. | |

FOREIGN PATENT DOCUMENTS

| | | |
|---|---|---|
| EP | 2 648 364 A2 | 10/2013 |
| WO | 2010120303 A2 | 10/2010 |
| WO | WO-2013/033259 A2 | 3/2013 |
| WO | 2015131121 A1 | 9/2015 |

OTHER PUBLICATIONS

Non-Final Office Action for U.S. Appl. No. 16/248,277 dated Sep. 10, 2021, 20 pages.

Dec. 9, 2020—U.S. Non-Final Office Action—U.S. Appl. No. 16/248,277.

Apr. 1, 2021—U.S. Final Office Action—U.S. Appl. No. 16/248,277.

"TIA launches mobile app for insured object inspection in the field" http://www.tiatechnology.com/en/whats-new/tia-echnology-launches-mobile-app-for-insured-object-inspection-in-the-field/ site visited Sep. 19, 2016, pp. 1-4.

"New Inspection Mobile App Enables Real-Time Inspection of Insurance Claims" http://www.prnewswire.com/news-releases/new-inspection-mobile-app-enables-real-time-inspection-of-insurance-claims-300114092.html Jul. 16, 2015, pp. 1-3.

"Residential/Commercial Storm Damage Report Mobile App" http://www.gocanvas.com/mobile-forms-apps/22692-Residential-Commercial-Storm-Damage-Report site visited Sep. 19, 2016, pp. 1-6.

Oct. 17, 2017—U.S. Non-Final Office Action—U.S. Appl. No. 15/679,946.

Royalwise; "iMessages and FaceTime Sharing Issues"; Publication date: Dec. 10, 2014; Date Accessed: Nov. 8, 2017; URL: <http://royalwise.com/imessages-facetime-sharing-issues/>.

Drippler; "15 Best Camera Apps for Android"; Publication date: Jun. 8, 2016; Date Accessed: Nov. 8, 2017; URL: <http://drippler.com/drip/15-best-camera-apps-android>.

iPhone Life; "Tip of the Day: How to Move your Image in FaceTime"; Publication date: Feb. 16, 2015; Date Accessed: Nov. 8, 2017; URL: <https://www.iphonelife.com/blog/32671/how-move-your-image-facetime>.

CNET; "OoVoo Mobile takes on Qik Fring for Android video chat"; Publication date: Dec. 15, 2010; Date Accessed: Nov. 8, 2017; URL: <https://www.cnet.com/news/oovoo-mobile-takes-on-qik-fring-for-android-video-chat/>.

Microsoft; "OoVoo—Video Calls and Messaging"; Publication date unknown but prior to filing date; Date Accessed Nov. 8, 2017; URL: <https://www.microsoft.com/en-us/store/p/oovoo-video-calls-and-messaging/9wzdncrfj478>.

Softonic; "How to make video calls with Viber on Android and iOS"; Publication date: Sep. 12, 2014; Date Accessed: Nov. 8, 2017; URL: <https://en.softonic.com/articles/how-to-make-video-calls-with-viber-on-android-and-ios>.

CNET; "Who needs FaceTime? 4 video-calling apps for Android"; Publication date: Mar. 20, 2015; Date Accessed Nov. 8, 2017; URL: <https://www.cnet.com/news/android-video-calling-apps/>.

Jan. 5, 2018—(WO) International Search Report—PCT/US17/56490.

Apr. 27, 2018—U.S. Final Office Action—U.S. Appl. No. 15/679,946.

Sep. 6, 2018—U.S. Notice of Allowance—U.S. Appl. No. 15/679,946.

"Leader Delegation and Trust in Global Software Teams", Zhang, New Jersey Institute of Technology, ProQuest Dissertations Publishing, Year 2008.

Jan. 9, 2019—U.S. Non-Final Office Action—U.S. Appl. No. 29/627,412.

Jan. 11, 2019—U.S. Notice of Allowance—U.S. Appl. No. 29/627,423.

Jan. 15, 2019—U.S. Notice of Allowance—U.S. Appl. No. 29/627,425.

Jan. 17, 2019—U.S. Notice of Allowance—U.S. Appl. No. 29/627,415.

Mar. 12, 2019—U.S. Non-Final Office Action—U.S. Appl. No. 15/294,147.

Mar. 4, 2019—(CA) Office Action—Application 181524.

Jun. 25, 2019—U.S. Final Office Action—U.S. Appl. No. 29/627,412.

Screens Icons, Andrejs Kirma, Dec. 28, 2016, iconfinder.com [online], [site visited Jun. 19, 2019], https://www.iconfinder.com/iconsets/screens-2, Year 2016.

Aug. 23, 2019—U.S. Final Office Action—U.S. Appl. No. 15/294,147.

Nov. 29, 2019 U.S. Notice of Allowance and Fees Due—U.S. Appl. No. 26/627,420.

Jan. 15, 2020—U.S. Notice of Allowance—U.S. Appl. No. 15/294,147.

Mar. 26, 2020—U.S. Notice of Allowance—U.S. Appl. No. 15/874,629.

"GeorSpace/sup TM/-A Virtual Collaborative Software Environment for Interactive Analysis and Visualization of Geospatial Information", Baraghimian et al., IEEE 2001 International Geoscience and Remote Sensing Symposium, Cat. No. 01CH37217, Year 2001.

Non-Final Office Action for U.S. Appl. No. 16/919,899 dated Nov. 2, 2021, 13 pages.

(56) References Cited

OTHER PUBLICATIONS

Final Office Action on U.S. Appl. No. 16/919,899 dated May 2, 2022, 11 pages.

Narendra, et al., "MobiCoStream: Real-time collaborative video upstream for Mobile Augmented Reality applications," 2014 IEEE International Conference on Advanced Networks and Telecommunications Systems, 6 pages (2014).

Office Action for U.S. Appl. No. 16/248,277 dated Jan. 26, 2022, 9 pages.

Notice of Allowance on U.S. Appl. No. 16/248,277 dated May 27, 2022, 9 pages.

Osorio, et al., "A Service Integration Platform for Collaborative Networks," Studies in Informatics and Control 20(1), pp. 19-30 (2011).

Morris, "Collaborative search revisited," CSCW'13: Proceedings of the 2013 Conference on Computer Supported Cooperative Work, pp. 1181-1192 (2013).

Notice of Allowance for U.S. Appl. No. 16/919,899 dated Oct. 5, 2022, 9 pages.

\* cited by examiner

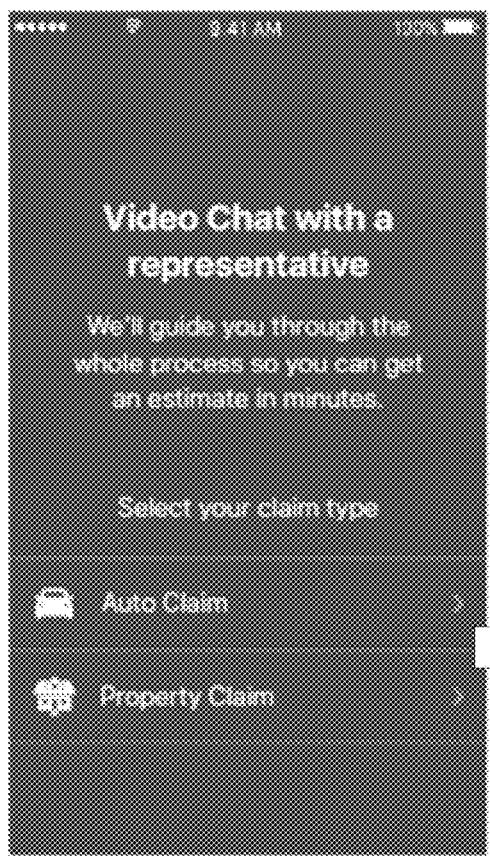
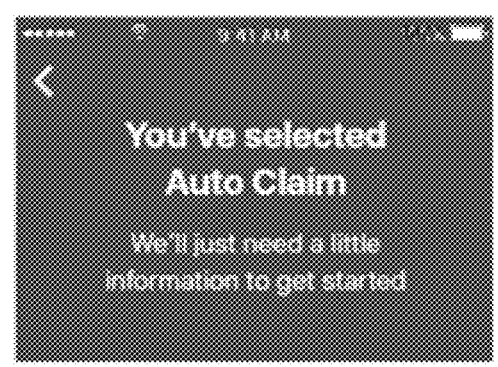
Fig. 5a
Fig. 5b

VIRTUAL COLLABORATION

CROSS REFERENCE TO RELATED APPLICATIONS

This application is a continuation of U.S. patent application Ser. No. 15/294,147, filed Oct. 14, 2016, entitled "VIRTUAL COLLABORATION", which is incorporated herein by reference in its entirety.

FIELD OF ART

The present disclosure relates to communications systems for appraisal of property by a remote viewer. More specifically, it relates to methods, software, and apparatuses for connecting a user with damaged property in need of appraisal to an available adjuster in a remote location via an audiovisual teleconference.

BACKGROUND

When an insurance claim is filed to cover damage to insured property, the property owner often has the damage appraised by a claims adjuster who can determine an appropriate estimate of compensation to the owner.

However, making the property available for the adjuster's appraisal can be inefficient and time-costly. Either the property must be conveyed to the other's location or vice versa, and a mutually agreeable time for the appraisal must be determined beforehand.

Traditional customer service systems may allow contact between claims adjusters and owners without travel or making appointments, but telephonic communication is virtually useless for allowing an accurate appraisal by remote means. Sending pictures is similarly deficient, especially if the owner does not understand how best to portray the damage.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for providing two-way audiovisual communication between a property owner and a claims adjuster, using a camera and microphone of a mobile computing device of the property owner and a camera and microphone of a computer of the adjuster remote from the property owner.

Claims adjusters may be organized in a queue ranked by amount of time spent waiting to answer an owner's call. Upon an owner's calling in, an adjuster may be selected, and may be able to use one or more cameras of the owner's mobile computing device to view and appraise property. The adjuster may converse with the owner to ask questions or instruct the owner to change camera angles, and at the conclusion of the call, may cause the owner to be compensated for damage to the property or may dispatch an appraiser to the property based on infeasibility of thorough or accurate remote examination.

Managers may be able to watch over the queue and to manage individual adjusters by modifying their attributes in order to keep the queue balanced with demand for adjusters appropriate to the distribution of owners currently calling.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 5A-F depict example user interfaces used for a property owner to contact a claims adjuster and display property damage to the adjuster according to one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
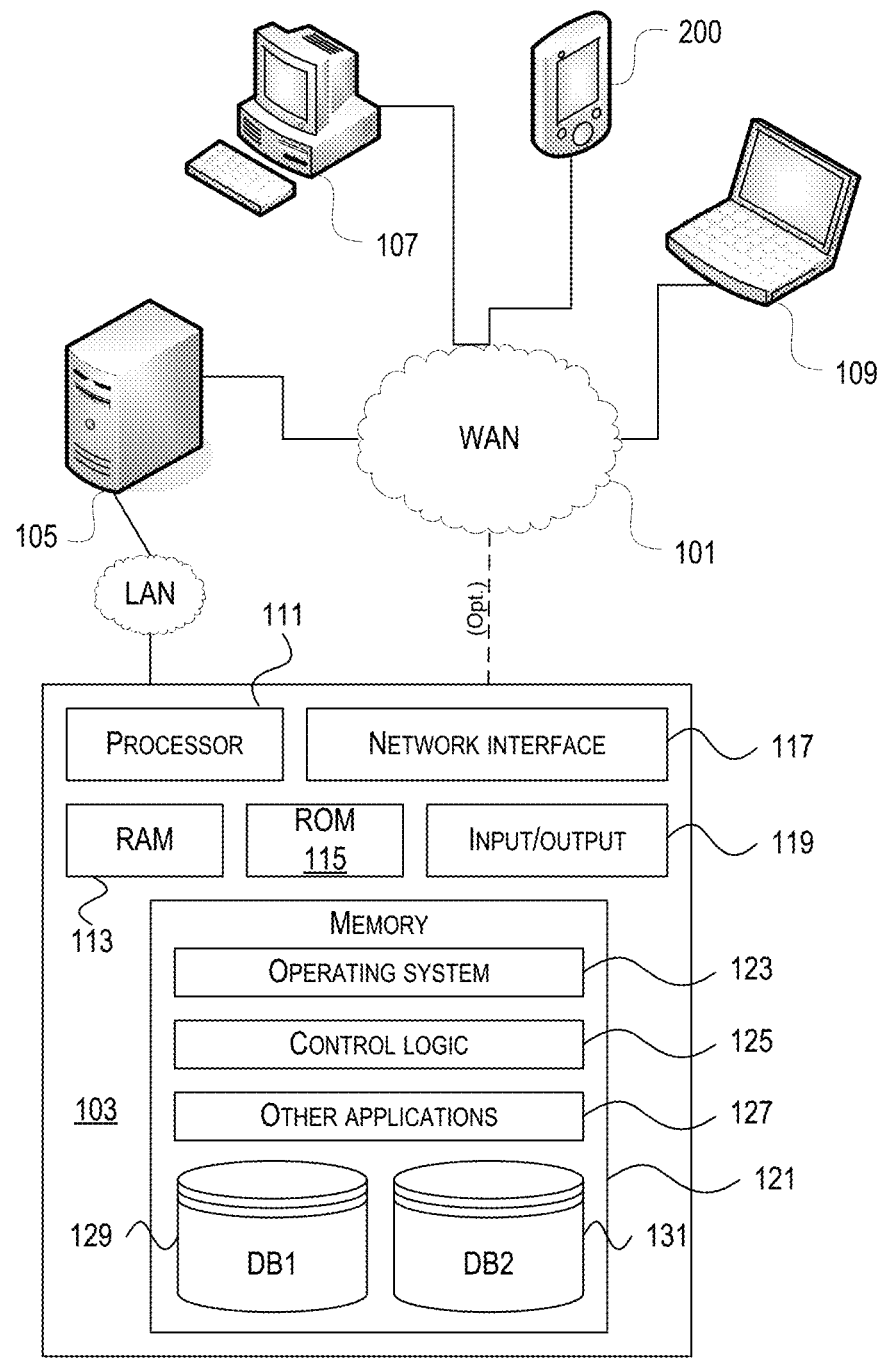
FIG. 1 illustrates a network environment and computing system that may be used to implement aspects of the disclosure.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include virtual collaboration server 103, web server 105, and client computers 107, 109. Virtual collaboration server 103 provides overall access, control and administration of databases and control software for performing one or more illustrative aspects described herein. Virtual collaboration server 103 may be connected to web server 105 through which users interact with and obtain data as requested. Alternatively, virtual collaboration server 103 may act as a web server itself and be directly connected to the Internet. Virtual collaboration server 103 may be connected to web server 105 through the network 101 (e.g., the Internet), via direct or indirect connection, or via some other network. Users may interact with the virtual collaboration server 103 using remote computers 107, 109, e.g., using a web browser to connect to the virtual collaboration server 103 via one or more externally exposed web sites hosted by web server 105. Client computers 107, 109 may be used in concert with virtual collaboration server 103 to access data stored therein, or may be used for other purposes. For example, from client device 107 a user may access web server 105 using an Internet browser, or by executing a software application that communicates with web server 105 and/or virtual collaboration server 103 over a computer network (such as the Internet).

Client computers 107 and 109 may also comprise a number of input and output devices, including a video camera (or "webcam"), microphone, speakers, and monitor, enabling two-way audiovisual communication to and from the client computers.

Servers and applications may be combined on the same physical machines, and retain separate virtual or logical addresses, or may reside on separate physical machines.

FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and virtual collaboration server 103 may be combined on a single server.

Each component 103, 105, 107, 109 may be any type of computer, server, or data processing device configured to perform the functions described herein. Virtual collaboration server 103, e.g., may include a processor 111 controlling overall operation of the virtual collaboration server 103. Virtual collaboration server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the virtual collaboration server 103, control logic 125 for instructing virtual collaboration server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of virtual collaboration server 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figures 2A, 2B:
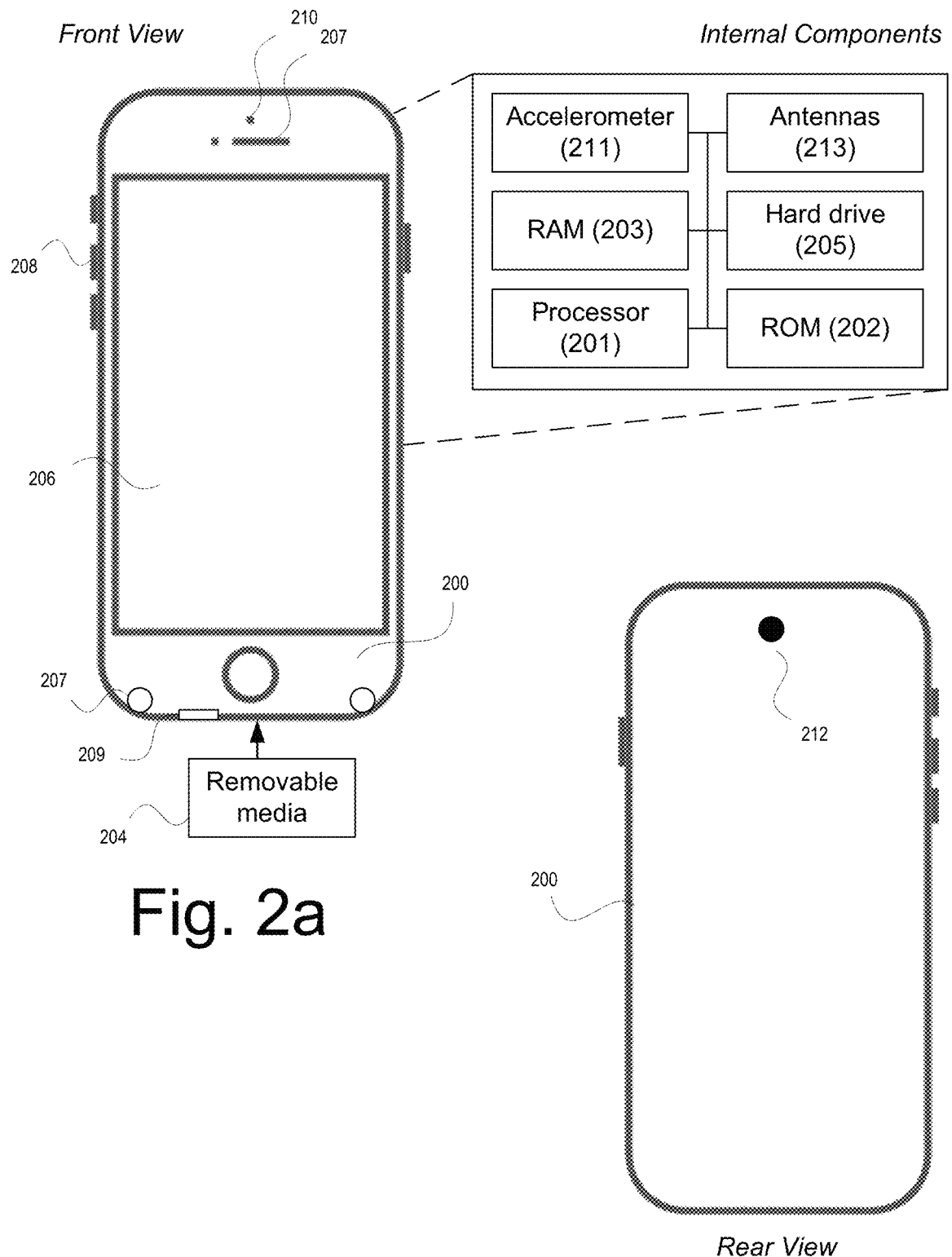
FIG. 2A illustrates a front view and internal components of an example mobile computing device that may be used to implement aspects of the disclosure.
FIG. 2B illustrates a rear view of an example mobile computing device that may be used to implement aspects of the disclosure.

FIGS. 2A and 2B illustrate a front view and rear view, respectively, of general hardware elements that can be used to implement any of the various systems or computing devices discussed herein. A mobile computing device 200, which may be a smartphone, personal data assistant, portable computer, laptop computer, etc., may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a secure digital (SD) card, or any other desired storage medium. Instructions may also be stored in an internal hard drive 205.

The mobile computing device 200 may include one or more output devices, such as a display 206 or one or more audio speakers 207. There may also be one or more user input devices, such as a number of buttons 208, as well as a microphone 209, a touchscreen built into display 206, and/or a forward-facing camera 210 (which may include multiple cameras for three-dimensional operation) for user gestures. The mobile computing device 200 may comprise additional sensors, including but not limited to a multiple-axis accelerometer 211 or rear-facing camera 212. Rear-facing camera 212 may further be an array of multiple cameras to allow the device to shoot three-dimensional video or determine depth. The mobile computing device may further comprise one or more antennas 213 for communicating via a cellular network, Wi-Fi or other wireless networking system, Bluetooth, near field communication (NFC), or other wireless communications protocols and methods.

The mobile device 200 is one example hardware configuration, and modifications may be made to add, remove, combine, divide, etc. components of mobile computing device 200 as desired. Multiple devices in communication with each other may be used, such as a mobile device in communication with a server or desktop computer over the Internet or another network, or a mobile device communicating with multiple sensors in other physical devices via Bluetooth, NFC, or other wireless communications protocols. Mobile computing device 200 may be a custom-built device comprising one or more of the features described above, or may be a wearable device, such as a smart watch or fitness tracking bracelet, with custom software installed, or may be a smartphone or other commercially available mobile device with a custom "app" or other software installed.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Mobile device 200 may be used to run a mobile application into which the user inputs information, such as a username and/or password for login, or an actual name, claim number, property type, contact information, and any other information relevant to an insurance claim. The application may then use an internet connection or other network connection to contact the virtual collaboration server and initiate communications with the server and/or one or more client computers. The application may also access one or more cameras and/or a microphone of the mobile device and transmit video and audio to a remote computer, and play video and audio received in return, to allow communications between the mobile device's operator and a remote adjuster.

Figure 3:
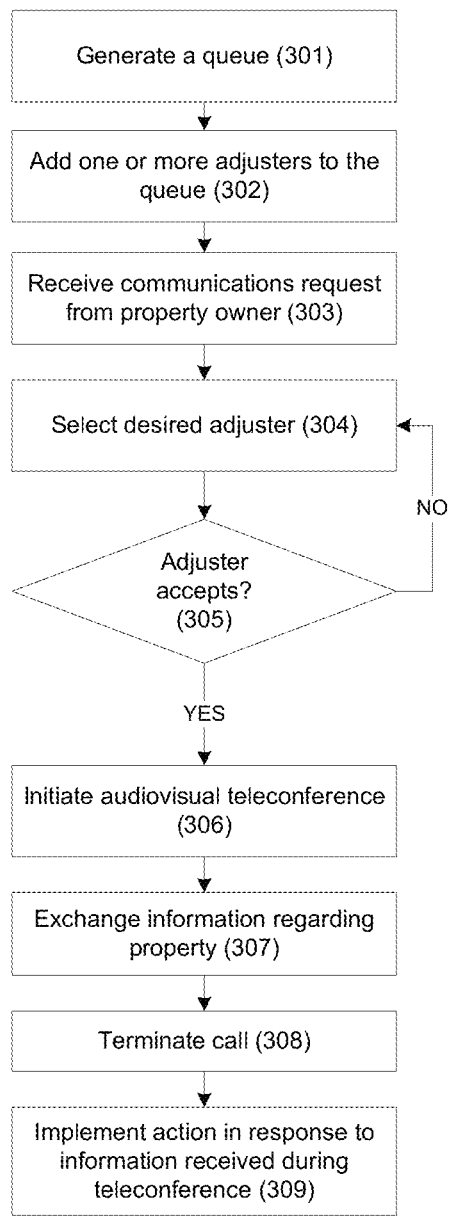
FIG. 3 is a flow diagram illustrating an example method of assigning claim adjusters in a queue to incoming calls from property owners according to one or more aspects described herein.

FIG. 3 illustrates an example programmatic flow of an embodiment according to aspects described herein. Some or all of the illustrated steps may be performed by a computing device, such as virtual collaboration server 103 illustrated in FIG. 1, executing instructions stored on a computer-readable medium.

In step 301, the system may generate a queue data structure for tracking a number of logged-in claims adjusters and one or more attributes for each adjuster. Attributes may include, for example, amount of time spent in the queue, amount of time spent in the queue since a last event (such as completing a call with a property owner or going idle), a classification or skill of the adjuster (such as specialization in auto claims or claims related to other property), or a manager assigned to the given adjuster. Each claims adjuster may be associated with a computing device configured to communicate with the system and/or with one or more mobile devices of one or more users.

In step 302, the system may add one or more claims adjusters to the queue. Each claims adjuster may begin by logging in with a unique user identification number or string entered into a user interface on a computing device such as device 107 or device 109 that is networked to or in communication with server 103.

When logging into the system, a claims adjuster may be prompted to select one of a number of video capture devices of the adjuster's computer to capture video during any two-way video transmissions with a user. The claims adjuster may similarly be prompted to select one of a number of audio capture devices of the adjuster's computer to capture audio during any two-way audio transmissions with a user. The adjuster may further be prompted to select one or more speakers to emit audio received from a user if more than one speaker is connected to the adjuster's computer.

Figure 4A:
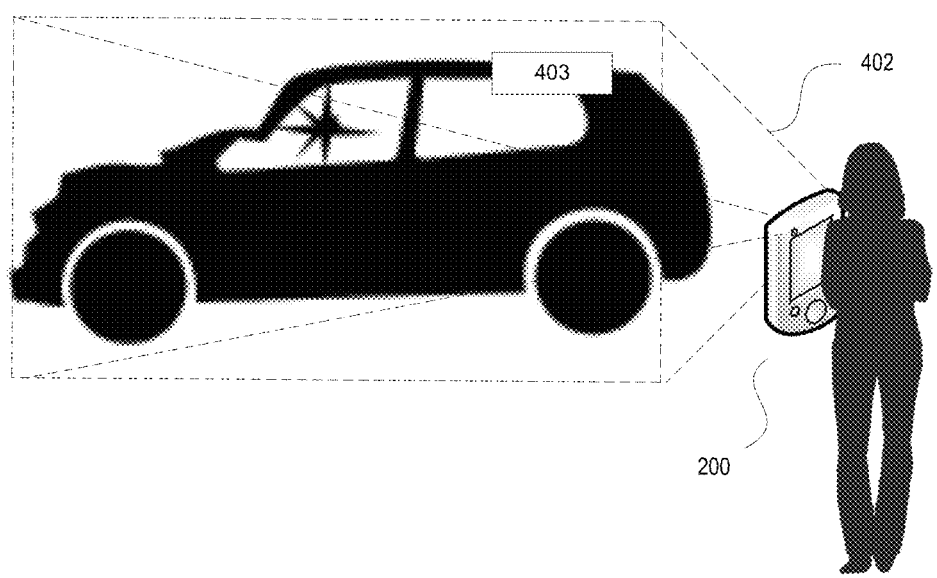
FIG. 4A depicts a property owner initiating a video transmission of his or her damaged property according to one or more aspects described herein.

In step 303, the system may receive a two-way communications request from a property owner. Preferably, before initiating the communications, the property owner will move to the location of damaged property subject to an insurance claim, as depicted in FIG. 4A and described in further detail below. Further, FIG. 5 and its description below further describe the process of initiating the communications request from the property owner's viewpoint.

The request may include one or more attributes, including, for example, a property type that the property owner wishes the claims adjuster to see. The request may be received by a webserver as an HTTP (Hypertext Transfer Protocol) request, or may use another server-client style protocol or messaging architecture. The request may also comprise the property owner's name or a previously assigned username, contact information for the property owner, and/or a claim number already assigned.

Property that may be damaged may include automobiles, other vehicles (such as boats, motorcycles, bicycles, mopeds, or airplanes), houses, other structures, or personal property (such as artwork, electronics, clothing, furniture, or anything else of value).

In step 304, the system may select a claims adjuster to whom the incoming call should be assigned. The system may select an adjuster on a basis of longest time waiting in queue (i.e. first in, first out), or may select based on one or more factors. For example, the system may select an adjuster who has been waiting the longest out of all adjusters with a particular attribute, such as experience with a property type identified in the request. The system may select an adjuster who has been waiting the longest out of all adjusters who are currently available and/or who has not marked himself or herself unavailable. The system may select an adjuster who has been waiting the longest out of all adjusters without being idle at his or her computer. The system may select an adjuster who has been waiting the longest out of all adjusters having a certain experience level. The system may select an adjuster who has been flagged to receive the next incoming call regardless of place in the queue or time waited. The system may select an adjuster who has handled the fewest calls during a given period of time such as the last month, last week, last 24 hours or last 8 hours. The system may select an adjuster who has declined the most or the fewest calls during a given period of time. The system may select an adjuster who has historically handled calls with a shortest call length. The system may use a number of the factors above, or other factors, to combine and score all adjusters with a numerical score on each of a plurality of criteria, selecting an adjuster with a highest overall score or an adjuster who has waited the longest in queue of all adjusters with a given score range.

Figure 4B:
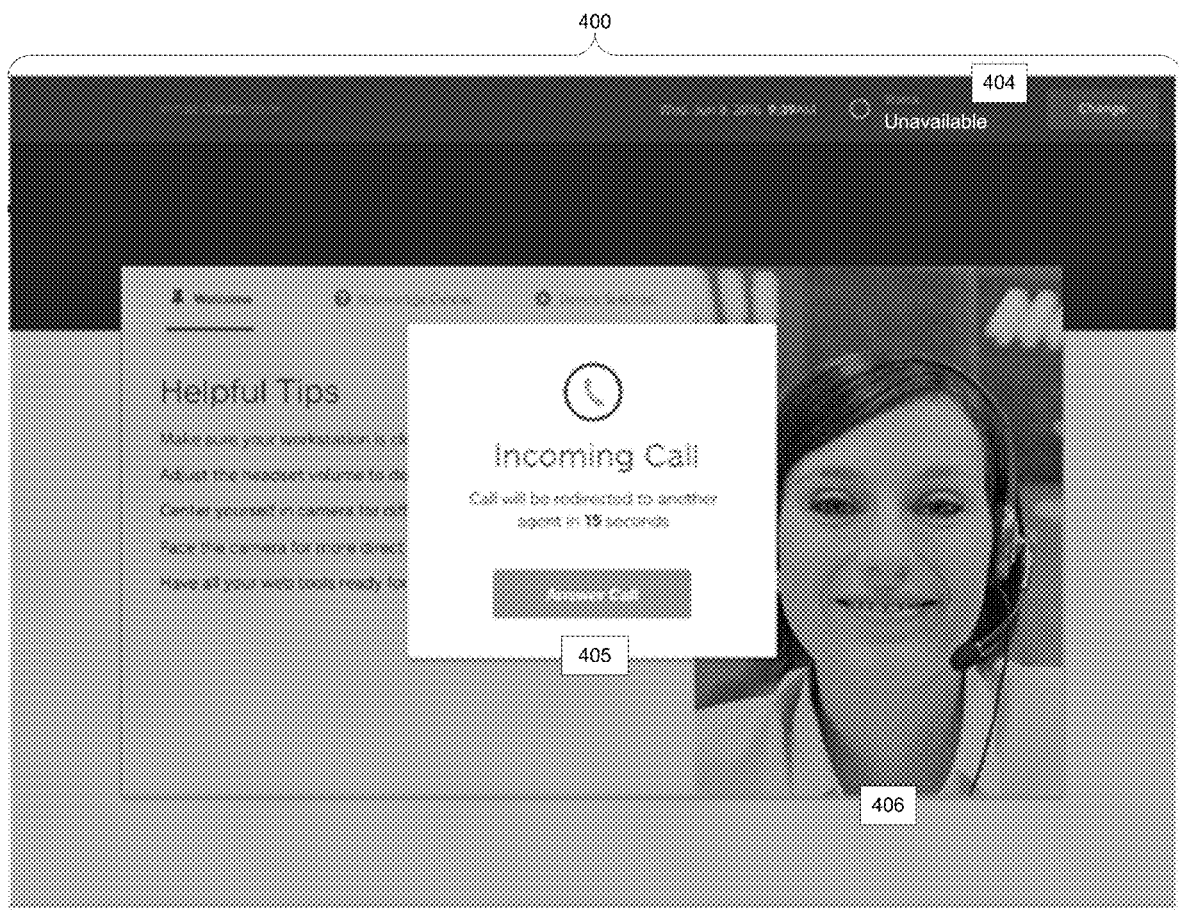
FIG. 4B depicts an example user interface used by a claims adjuster when receiving a request from a property owner for two-way audiovisual communication according to one or more aspects described herein.

Once an adjuster has been selected, in step 305, the adjuster selected by the system may be notified of the selection and prompted to accept or decline an incoming communication. FIG. 4b, described in further detail below, depicts a possible user interface for making and entering this decision. If the adjuster accepts at step 305, the process proceeds to step 306, and if the adjuster declines at step 305, the process may instead return to step 304 to select a different adjuster. If step 304 is repeated, the system may select a different adjuster by using the same criteria used for selecting the previous adjuster and selecting a second-best adjuster according to those criteria, or may select a different adjuster by using new criteria.

In step 306, a two-way audiovisual communication may be established between the property owner and the selected adjuster. A web-based protocol may be used for cross-platform communication between the system on server 103, the computing device 107 being operated by the claims adjuster, and the mobile computing device 200 being operated by the property owner. Any one of a number of existing open-source, commercial, or custom video transmission protocols and platforms may be used.

In an alternative embodiment, the system may direct that communications be established directly between adjuster's computing device 107 and property owner's mobile computing device 200, without passing through server 103.

Figure 4C:
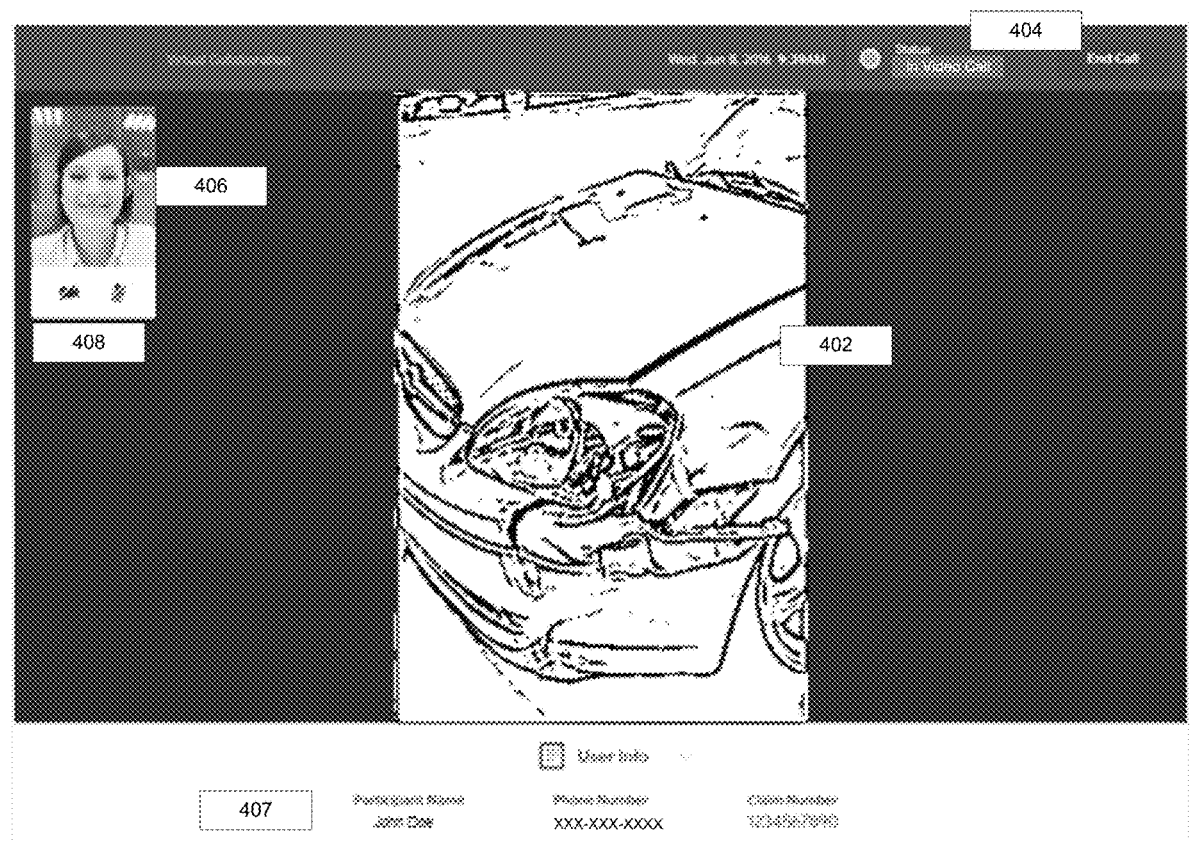
FIG. 4C depicts an example user interface used by a claims adjuster to display the two-way audiovisual communication and to converse with the property owner according to one or more aspects described herein.

In step 307, the adjuster may use the audiovisual communication to gather information regarding property that is damaged. The adjuster may view the property through a camera of mobile computing device 200, may hear the property (if, for example, it is a damaged television or musical instrument) through a microphone of the mobile computing device, may ask questions of the property owner and receive answers, or may direct the property owner to move the camera to allow the adjuster a better vantage point/different angles of viewing, or to move an obstruction out of the way for a better view. FIG. 4C, discussed further below, depicts a possible user interface used by the adjuster during the call.

If the adjuster determines that he or she is not suited to appraise the property—for example, because of user error in identifying a property type—the adjuster may input a command to terminate the call and re-generate the call request to repeat steps 303 and following, and to allow the owner to be connected to a different adjuster by the system.

The adjuster may be able to record the video from the call, record the audio from the call, or capture still images from the video. The data may be saved either locally on the adjuster's computing device or to a remote server for later retrieval. The adjuster may also be able to enter notes into a text field or via other user input field while viewing the property.

In step 308, the adjuster may conclude that there is sufficient data from the call to act, and may terminate the communications with the property owner.

In step 309, the adjuster may determine a next course of action and implement it. The adjuster may conclude based on the gathered information that a clear estimate of the property damage is possible, for example if there is no damage, if the property is a total loss, or if the damage is of a commonly encountered type. In this circumstance, the adjuster may be able to input an amount of money to be given to the property owner, and to automatically have a check created and mailed to the property owner, or automatically credited to a known account of the property owner. The adjuster may alternatively conclude that the damage will be difficult to estimate based on a remote viewing alone, and may be able to dispatch an adjuster to the property to view in person, or to make an appointment for the property owner to bring the property to an adjuster for appraisal and to notify the property owner of the appointment. The system may transmit an instruction to a computing device associated with this other adjuster so that the other adjuster will receive the pertinent information about the claim and information regarding where and when to perform an in-person, physical inspection of the property.

After the determination is made, the owner's device may notify the owner that funds have already been deposited in an account of the owner, or that the appraisal via video call was unsuccessful and that an appointment has been or must be made for an in-person appraisal by another claims adjuster.

In an alternative embodiment, the system could instead be used for appraisal by a doctor or claims adjuster of an individual insured with health insurance rather than a property owner. In such an embodiment, skill types saved as attributes for members of the queue could be fields of medical expertise or other medical skills, rather than property types. The operator of the mobile device may be a doctor, another medical personnel, or other third party who may help a remote doctor or adjuster to inspect or perform a physical on a person submitting a health insurance claim.

FIG. 4A depicts a property owner initiating a video transmission of his or her damaged property. Before or after initiating communications, a property owner may take his or her mobile computing device to the location of damaged property 403 and align the mobile device such that the property is within the view window 402 of a camera of the mobile computing device 200.

Upon initiating the request (which may be made via an online system, mobile application executing on the mobile device 200, or the like), a user interface may be displayed to a claims adjuster. FIG. 4B depicts an example user interface 400 used by a claims adjuster when receiving a request from a property owner for two-way audiovisual communication. An adjuster, while waiting for an incoming call, may be able to see a live video stream 406 of the adjuster through a camera of her own computer to ensure that she is centered in frame and otherwise prepared for a face-to-face communication with a customer/property owner. She may also use status bar 404 to view her current status and to change that status. For example, an adjuster's status may be "Available", "In Video Call", "Wrap Up", "Unavailable", "Idle", "Logged Out", or a number of other statuses. A button marked "Change" or a similar label may be engaged to allow the adjuster to select a new status. Statuses may automatically change in response to actions or inactions, such as accepting a call, terminating a call, or not interacting with the user interface changing the status to "Unavailable", "Available", or "Idle", respectively.

When the incoming communications request causes the adjuster to be selected by the system, an incoming call window 405 may appear. The adjuster may accept the call by clicking an appropriate button within the window. The adjuster may decline the call either by clicking a decline button which may be present, or by failing to accept the call within a predetermined period of time, such as 3 seconds, 5 seconds, or 10 seconds.

FIG. 4C depicts an example user interface used by a claims adjuster to display the two-way audiovisual communication and to converse with the property owner. During the call, the adjuster may be able to see the damaged property 402. The adjuster may also be able to continue viewing herself 406 in a less prominent part of the user interface throughout the call. The adjuster may be able to continue adjusting her status mid-call via status bar 404, may mute her own microphone or turn off her camera with controls 408, and may view information 407 already received from the property owner before initiation of the call. The status bar may be used to end the call when the adjuster decides that sufficient information has been gathered.

FIGS. 5A-5F depict example user interfaces that may be used for a property owner to contact a claims adjuster and show property damage to the adjuster. The interfaces may be presented to the user via an online or mobile application executing on the mobile device 200 of the user.

In FIG. 5A, a property owner may be prompted to select a property type 501 for the damaged property and progress to a next screen.

In FIG. 5B, the property owner may be prompted to enter one or more of a name, username, contact information, or a claim number 502. Alternatively, these fields may be pre-filled if the owner has already logged in and the system has access to a database containing recent claims filed for each customer. The owner may progress to a next screen via confirmation button 503.

Figure 5C:
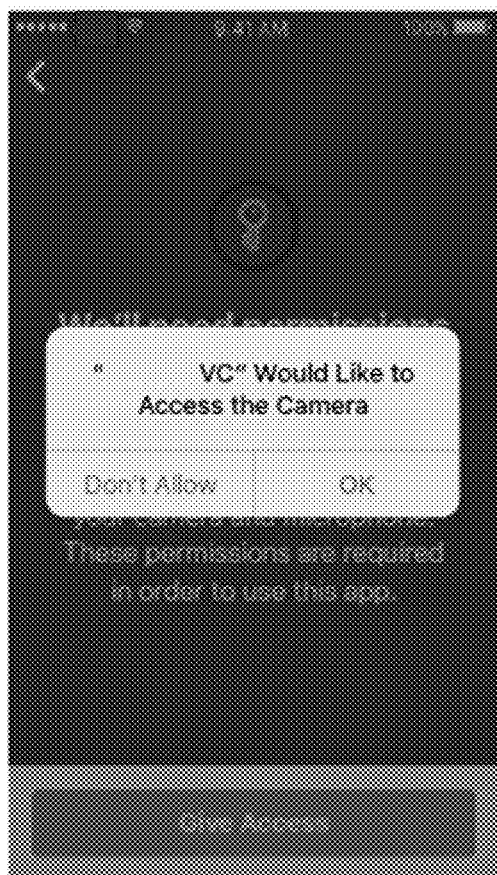

In FIG. 5C, the property owner may be prompted to authorize the use of a camera and/or a microphone of the mobile computing device 200. In response to allowance, the owner may progress to a next screen.

Figure 5D:
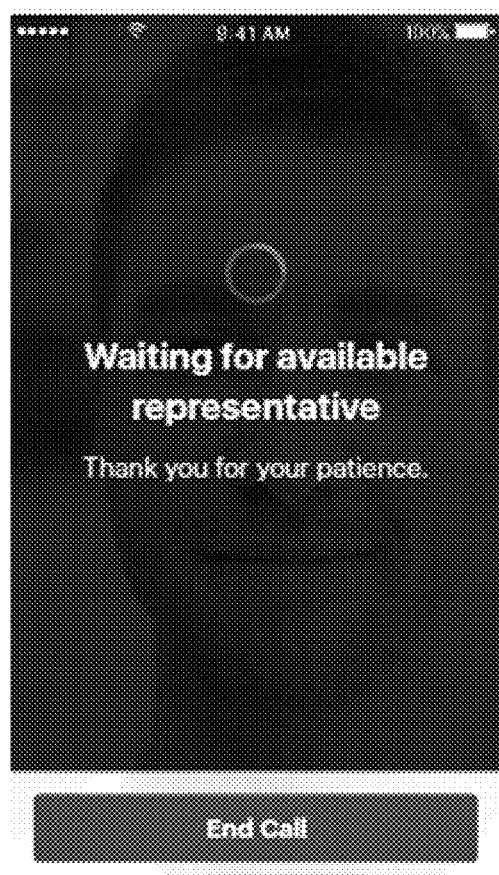

In FIG. 5D, the property owner may be notified that they will soon be connected to an adjuster. At this time, the request to initiate communications comprising the data 501 and/or 502 may be transmitted to the system, and steps 303 and the following may be performed.

Figure 5E:
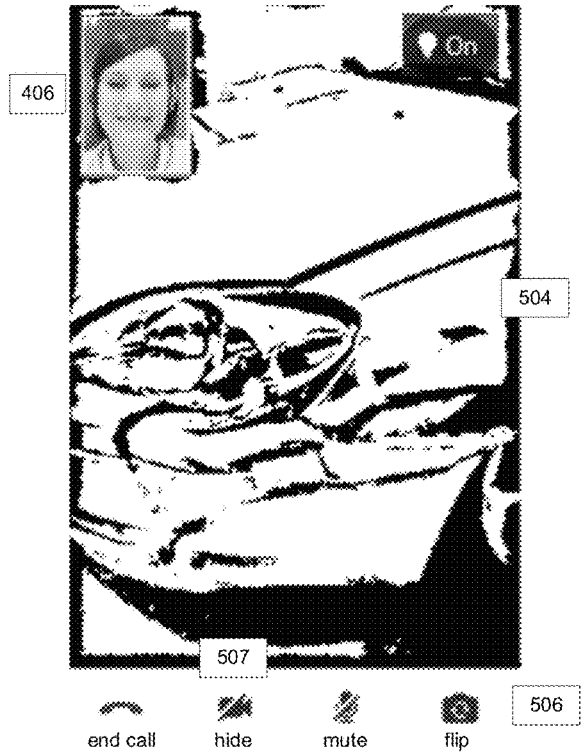
Figure 5F:

In FIG. 5E, the property owner may be able to view the video 504 being captured from a rear-facing camera of the mobile computing device as the owner speaks with the adjuster using the microphone. The owner may further be able to view the video 406 of the adjuster in a less prominent position. In FIG. 5F, an alternative viewing configuration, the property owner may be able to view the video 406 of the adjuster most prominently and video 505 of himself in a less prominent position. Flipping button 506 may be used to switch between views of FIGS. 5E and 5F by causing the video feed to be provided from rear-facing camera 212 or front-facing camera 210 of mobile computing device 200. Controls 507 may be used to mute the microphone, turn off the camera, or end the call.

Figure 6A:
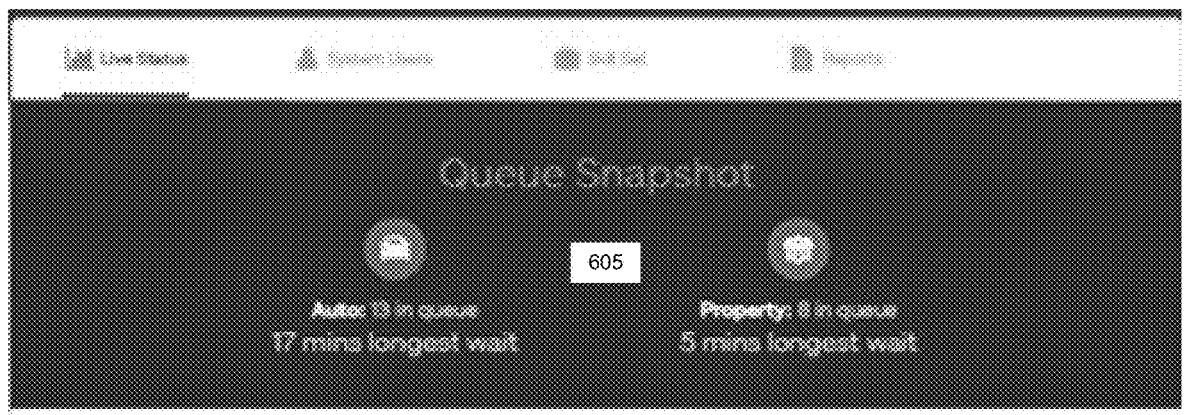
FIG. 6A depicts an example user interface used for a queue manager to obtain information on the status of the queue according to one or more aspects described herein.

FIG. 6A depicts an example user interface for a queue manager to obtain information on the status of the queue. A table may be generated comprising one of more of a list of adjusters' names 601, adjusters' skills or other stored attributes 602, adjusters' statuses 603, and durations in the queue 604. The manager may further be able to see a "queue snapshot" 605 or other summary of queue statistics that may indicate a need for rebalancing of adjusters between queue types to improve customer service.

Figure 6B:
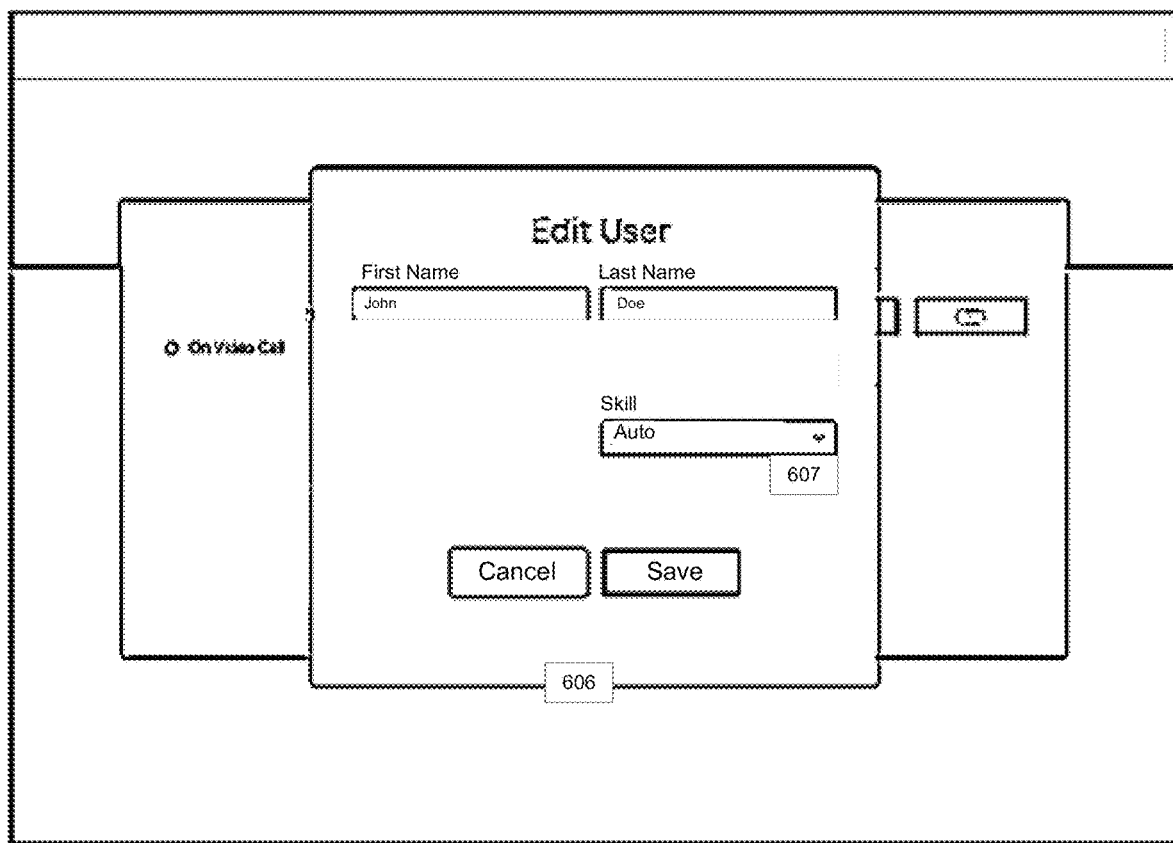
FIG. 6B depicts an example user interface used for a queue manager to add adjusters to a queue, edit adjusters' attributes, and/or reassign adjusters within a queue according to one or more aspects described herein.

FIG. 6B depicts an example user interface for a queue manager to add adjusters to a queue, edit adjusters' attributes, and/or reassign adjusters within a queue. Upon clicking or otherwise selecting one of the existing adjusters or a "new adjuster" button, a window 606 may appear, displaying stored information about the adjuster and allowing the manager to edit that information and save it. The manager may be able to change a stored skill 607 or other attribute of an adjuster in order to manipulate the queue; for example, if one skill is in higher demand and an adjuster has multiple skills, the manager may shift the adjuster's entry from a low demand skill to a high demand skill to balance out available adjusters with the composition of incoming calls.

A manager may furthermore be able to view/listen in real time to an ongoing call between an adjuster and a property owner. When an adjuster who is currently "In Call" is selected, an option may appear to allow one-way audiovisual communication from the adjuster to the manager and/or from the owner to the manager. Accordingly, the manager may be able to ensure that adjusters are appropriately performing duties, helping owners, and may use the information for training purposes with the adjuster after the call.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

We claim:
1. A method, comprising:
assigning, by a virtual collaboration server, to a queue, a plurality of claims adjusters,
wherein the plurality of claims adjusters comprises at least a first claims adjuster and a second claims adjuster wherein each of the plurality of claims adjusters having at least one attribute associated therewith, and the at least one attribute comprises a skill type,
wherein the skill type of the at least one attribute of the first claims adjuster is a first skill and
wherein the skill type of the at least one attribute of the second claims adjuster is a second skill;
determining, by the virtual collaboration server, a first wait time associated with the first claims adjuster of the plurality of claims adjusters, and a second wait time associated with the second claims adjuster of the plurality of claims adjusters;
causing, by the virtual collaboration server, display of:
the first wait time, and
the second wait time;
receiving, from a property owner mobile computing device comprising a camera, a microphone, and a speaker, and by the virtual collaboration server, a request to initiate a communication session, wherein the request is associated with the second skill;
retrieving, by the virtual collaboration server, after receiving the request, based on first wait time exceeding the second wait time, an instruction to modify the skill type of the at least one attribute associated with the first claims adjuster from the first skill to the second skill;
based on the retrieved instructions, modifying, by the virtual collaboration server, the at least one attribute associated with the first claims adjuster from the first skill to the second skill;
selecting, by the virtual collaboration server and based on the request being associated with the second skill, a computing device associated with the first claims adjuster;
transmitting, by the virtual collaboration server and to the computing device of the first claims adjuster, the request to initiate the communication session;
responsive to receiving an indication that the first claims adjuster has accepted the request to initiate the communication session, transmitting video and audio bidirectionally between the mobile computing device and the computing device of the first claims adjuster, wherein the video comprises video of damaged property for evaluation;
based at least in part on the transmitted video and audio, determining an amount of compensation to provide to an owner of the damaged property; and
transferring the determined amount of compensation for the damaged property displayed within the video to the owner of the damaged property.

2. The method of claim 1, wherein the second skill comprises an automotive claim type.

3. The method of claim 1, wherein the plurality of claims adjusters have a status which indicates an availability of each of the plurality of claims adjusters.

4. The method of claim 1, further comprising:
prior to transferring compensation, transmitting, by the virtual collaboration server, to a computing device of another claims adjuster in a location remote from the first claims adjuster, instructions to physically inspect the damaged property.

5. The method of claim 1, wherein the selection of the computing device associated with the at least one claims adjuster is further based on one or more statistics concerning previous calls of the first claims adjuster.

6. The method of claim 1, wherein the selection of the computing device associated with the first claims adjuster is further based on an experience level of the first claims adjuster.

7. The method of claim 1, further comprising:
subsequent to transmitting, by the virtual collaboration server, video and audio bidirectionally between the mobile computing device and the computing device of the first claims adjuster, terminating transmission, selecting a second computing device associated with a second claims adjuster from the plurality of claims adjusters, and transmitting video and audio bidirectionally between the mobile computing device and the second computing device associated with the second claims adjuster.

8. A system, comprising:
a virtual collaboration server; and
a first computing device comprising a microphone and a camera and associated with a first claims adjuster of a plurality of claims adjusters,
wherein the virtual collaboration server has memory containing instructions that, when executed by a processor, cause the virtual collaboration sever to:
assign to a queue, a plurality of claims adjusters,
wherein the plurality of claims adjusters comprises at least a first claims adjuster and a second claims adjuster,
wherein each of the plurality of claims adjusters has at least one attribute associated therewith, and the at least one attribute comprises a skill type,
wherein the skill type of the at least one attribute of the first claims adjuster of the plurality of claims adjuster is a first skill, and
wherein the skill type of the at least one attribute of a second claims adjuster is a second skill;
determine a first wait time associated with the first claims adjuster of the plurality of claims adjusters, and a second wait time associated with the second claims adjuster of the plurality of claims adjusters;
cause display of:
the first wait time, and
the second wait time;
receive a request to initiate a communication session, wherein the request is associated with the second skill;
retrieve, after receiving the request, based on the first wait time exceeding the second wait time, an instruction to modify the skill type of the attribute associated with the first claims adjuster from the first skill to the second skill;
based on the retrieved instructions, modify the skill type of the at least one attribute associated with the first claims adjuster from the first skill to the second skill;
select, based on the request being associated with the second skill, the second computing device;
transmit, to the second computing device, the request to initiate the communication session;
responsive to receiving an indication that the first claims adjuster has accepted the request to initiate the communication session, transmit video and audio bidirectionally to the second computing device, wherein the video comprises video of damaged property for evaluation;
based at least in part on the transmitted video and audio, determine an amount of compensation to provide to an owner of the damaged property; and transfer the determined amount of compensation for the damaged property displayed within the video to the owner of the damaged property.

9. The system of claim 8, wherein the second skill comprises an automotive claim type.

10. The system of claim 8, wherein the plurality of claims adjuster have a status which indicates an availability of each of the plurality of claims adjusters.

11. The system of claim 8, wherein the instructions, when executed by the processor, further cause the virtual collaboration server to:
prior to transferring compensation, transmit, to another claims adjuster in a location remote from the first claims adjuster, instructions to physically inspect the damaged property.

12. The system of claim 8, wherein the selection of the second computing device is further based on one or more statistics concerning previous calls of the first claims adjuster.

13. The system of claim 8, wherein the selection of the second computing device is further based on an experience level of the first claims adjuster.

14. The system of claim 8, wherein the information further comprises a current call duration of the first claims adjuster.

15. The system of claim 8, further comprising a property owner mobile computing device communicatively coupled to a camera, a microphone, and a speaker and configured to bidirectionally transmit and receive the video and audio from the first computing device.

16. One or more non-transitory computer-readable media containing instructions that, when executed by a processor on a virtual collaboration server, cause the processor to:
assign to a queue, a plurality of claims adjusters,
wherein the plurality of claims adjusters comprises at least a first claims adjuster and a second claims adjuster,
wherein each of the plurality of claims adjusters has at least one attribute associated therewith, and the at least one attribute comprises a skill type;
wherein the skill type of the at least one attribute of the first claims adjuster is the first skill, and
wherein the skill type of the at least one attribute of the second claims adjuster is the second skill;
determine a first wait time associated with the first claims adjuster of the plurality of claims adjusters, and a second wait time associated with the second claims adjuster of the plurality of claims adjusters;
cause display of:
the first wait time, and
the second wait time;
receive, from a property owner mobile computing device comprising a camera, a microphone, and a speaker, a request to initiate a communication session, wherein the request is associated with the second skill;
receive, after receiving the request, based on the first wait time exceeding the second wait time, an instruction to modify the skill type of the at least one attribute associated with the first claims adjuster from the first skill to the second skill;
based on the received instructions, modify the at least one attribute associated with the first claims adjuster from the first skill to the second skill;
select, based on the request being associated with the second skill, a computing device associated with the first claims adjuster;
transmit, to a computing device associated with the first claims adjuster, the request to initiate the communication session;
responsive to receiving an indication that the first claims adjuster has accepted the request to initiate the communication session, transmit video and audio bidirectionally between the property owner mobile computing device and the computing device associated with the first claims adjuster, wherein the video comprises video of damaged property for evaluation;
based at least in part on the transmitted video and audio, determine an amount of compensation to provide to an owner of the damaged property; and
transfer the determined amount of compensation for the damaged property displayed within the video to the owner of the damaged property.

17. The one or more non-transitory computer-readable media of claim 16, wherein the selection of the computing device associated with the first claims adjuster is further based on one or more statistics concerning previous calls of the first claims adjuster.

18. The one or more non-transitory computer-readable media of claim 16, wherein the instructions, when executed by processor on the virtual collaboration server, further cause the processor to:
subsequent to transmitting video and audio bidirectionally, terminate transmission, select a second computing device associated with the second claims adjuster, and transmit video and audio bidirectionally to and from a second computing device.

* * * * *